(12) United States Patent
Denoue et al.

(10) Patent No.: US 7,466,858 B2
(45) Date of Patent: Dec. 16, 2008

(54) METHODS FOR SLIDE IMAGE CLASSIFICATION

(75) Inventors: Laurent Denoue, Palo Alto, CA (US); Matthew Cooper, San Francisco, CA (US); David Hillbert, Palo Alto, CA (US); John Adcock, Menlo Park, CA (US); Daniel Billsus, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 463 days.

(21) Appl. No.: 11/116,484

(22) Filed: Apr. 28, 2005

(65) Prior Publication Data

US 2006/0245616 A1 Nov. 2, 2006

(51) Int. Cl.
*G06K 9/00* (2006.01)

(52) U.S. Cl. ............................ 382/170; 382/100

(58) Field of Classification Search ............. 382/170, 382/100
See application file for complete search history.

(56) References Cited

U.S. PATENT DOCUMENTS

| | | | | |
|---|---|---|---|---|
| 5,825,924 A | * | 10/1998 | Kobayashi | 382/219 |
| 6,278,446 B1 | * | 8/2001 | Liou et al. | 715/700 |
| 6,404,925 B1 | * | 6/2002 | Foote et al. | 382/224 |
| 6,452,615 B1 | | 9/2002 | Chiu et al. | |
| 6,819,452 B1 | * | 11/2004 | Richtsmeier et al. | 358/1.9 |
| 7,171,042 B2 | * | 1/2007 | Hartmann et al. | 382/159 |
| 7,194,114 B2 | * | 3/2007 | Schneiderman | 382/118 |
| 7,372,991 B2 | * | 5/2008 | Chen et al. | 382/173 |
| 2004/0202349 A1 | * | 10/2004 | Erol et al. | 382/100 |

OTHER PUBLICATIONS

Berna Erol, Jonathan J. Hull, and Dar-Shyang Lee "Linking Multimedia Presentations with their Symbolic Source Documents: Algorithm and Applications", ACM Multimedia Conference,2003.*
Classifying images on the web automatically, Rainer Lienhart and Alexander Hartmann, Journal of Electronic Imaging—Oct. 2002—vol. 11, Issue 4, pp. 445-454.*
P. Ziewer, "Navigational Indices and Full Text Search by Automated Analyses of Screen Recorded Data"; Proceedings of E-Learn 2004, Washington, D.C. Nov. 2004. 8 pages.
B. Erol and J. Hull. "Linking Presentation documents Using Image Analysis"; Proc. Asilomar Conf. On Signals, Systems, and Computers; 2003. 5 pages.
A. Girgensohn and J. Foote. "Video Classification Using Transform Coeffts" Proc. IEEE ICASSP, 1999. 4 pages.
SonicFoundry; Mediasite "A Complete Rich Media Publishing System" http://www.sonicfoundry.com/ last visit Nov. 11, 2006.
(Book) R.Duda and P. Hart. Pattern Classification and Screene Analysis. Wiley & Sons, New York, 1975.

* cited by examiner

*Primary Examiner*—Bhavesh M Mehta
*Assistant Examiner*—Hadi Akhavannik
(74) *Attorney, Agent, or Firm*—Fliesler Meyer LLP

(57) ABSTRACT

A method of classifying images as slide images or non-slide images can be done by capturing a video stream, analyzing an image of the video stream and determining whether the image is a slide image. The analyzing can be based on text height and/or edge region(s) of the image.

22 Claims, 7 Drawing Sheets

74 — text height based determination of slide images such that a first set of slide images is characterized with confidence

76 — use first set of slide images to characterize edge regions with respect to remainder regions.

78 — use edge based determination to find additional slide images from remainder images

Figure 8

METHODS FOR SLIDE IMAGE CLASSIFICATION

BACKGROUND OF THE INVENTION

The present invention relates generally to processing and storing images. More particularly it relates to extracting information from video presentations and storing the video presentations for later use.

DESCRIPTION OF THE RELATED ART

Slide presentations, especially computer generated slide presentations, are becoming more and more important in business and academia. Typically, a large number of presentations are given at corporations and colleges that would contain a lot of useful information if it were available to colleagues. It is therefore desirable to archive slide images used in presentations.

One way of doing this is to use software that interacts with the slide presentation software. This additional software can obtain and store the slide images of a presentation for later use. A problem with this type of solution is that it may restrict the type of slide presentation software and computer operating system that can be used. This type of solution would also have to be loaded onto all of the presenter's laptops and thus may be a burden for the presenters.

SUMMARY OF THE INVENTION

One embodiment of the present invention is a method of classifying images as slide images or non-slide images. A video stream can be captured. The video stream can be a video output, such as a RedGreenBlue (RGB) output of a computer which is sent to a projector. In one embodiment, the video stream can be sampled to obtain images. The images of the video stream can be analyzed and it can be determined whether a given image is a slide image.

In one embodiment, the system can be implemented with a slide analyzer device including a processor and memory. The slide analyzer device can be an appliance that intercepts a video stream between presentation devices, such as a notebook computer and a display device such as a projector. Alternately, the slide analyzer device can be a part of the display device.

Since the slide analyzer device uses the video stream output, the slide analyzer device is independent of the slide presentation software and computer operating system. Also, a presenter's notebook computer does not have to have pre-loaded software.

BRIEF DESCRIPTION OF THE DRAWINGS

Preferred embodiments of the present invention will be described in detail based upon the following figures, wherein;

FIG. 8 is a flow chart that illustrates a method which uses both the text height and the edge region or regions of the images to characterize the images as slide or non-slide images.

DETAILED DESCRIPTION OF THE INVENTION

In one embodiment, a slide analyzer can be used to capture, index and manage presentation media, such as slides and audio streams. With the presenter's permission, the system can seamlessly capture presentation media without any software requirements and unnecessary user interactions since a video stream is captured. The video capture can be paired with subsequent analyzing technology such as optical character recognition (OCR) technologies. A system based a video stream capture can be independent of the presenter device hardware or software. Once the presentations have been captured, users can search and browse using the resulting archive to locate content of interest. It is useful to be able to distinguish between slide and non-slide images, so that the users can focus on the presentation content rather than unrelated desktop or menu images. In addition, slide images can be reused within organization and cohesive textual representation and presentation context can be available for accurate retrieval, translation, or recommendation services. A web user interface can be used to allow user to search, replay and export captured content. The system is enhanced by knowing whether a given image is a slide image. That information allows the interface to filter non-slide images and to infer presentation boundaries by finding the first and last slide image of a presentation. These capabilities can be important to the interface since the proportion of the images that are slides can be quite low. In one experimental test, less than 25% of the images were slide images. Embodiments of the present invention describe methods of distinguishing of a slide image from a non-slide image.

Figure 1:
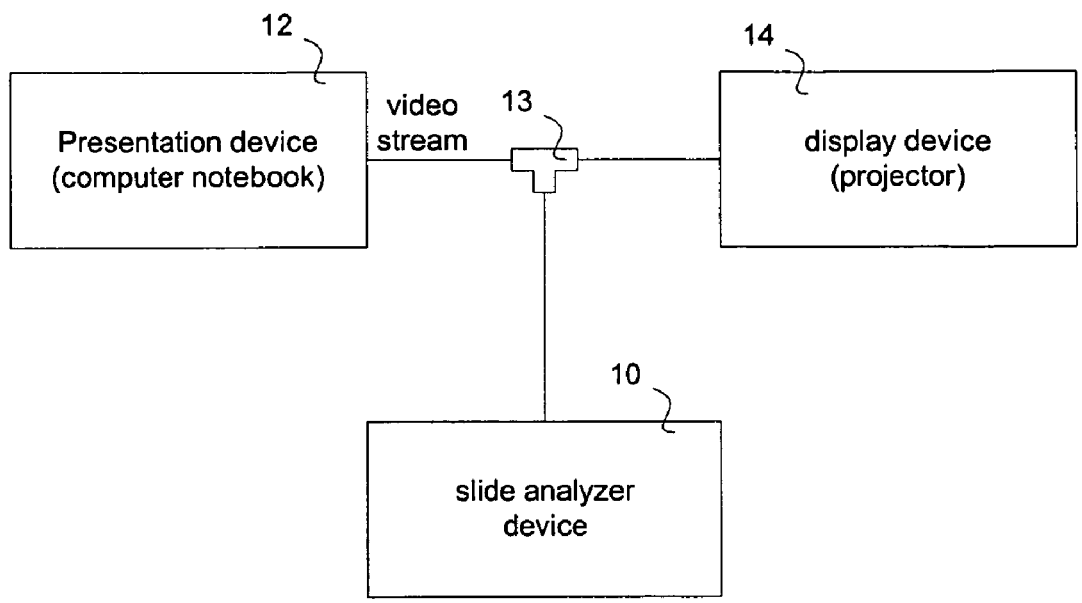
FIG. 1 is a diagram that illustrates a slide analyzer device which intercepts a video stream between a presentation device and a display device.

FIG. 1 illustrates a slide analyzer device 10. The slide analyzer device 10 intercepts a video stream between the presentation device 12 and a display device 14. The presentation device can be a computer, such as a notebook computer. The display device 14 can be a device used to display the video output to viewers of the presentation. The display device can be a Liquid Crystal Display (LCD) projector, analog projector, a Cathode Ray Tube (CRT) display, an LCD display or any other type of display.

A splitter 13, can split the video stream and output it to the slide analyzer device 10 and the display device 14. The video stream can be digital or analog and can comprise any number of signal formats. In one embodiment, the video stream is an RGB video stream. The video signal can also be a data signal containing video information, such as a Virtual Network Computing (VNC) signal. In one embodiment, the splitter 13 can also perform conversion of a data signal to a video signal.

Figure 2:
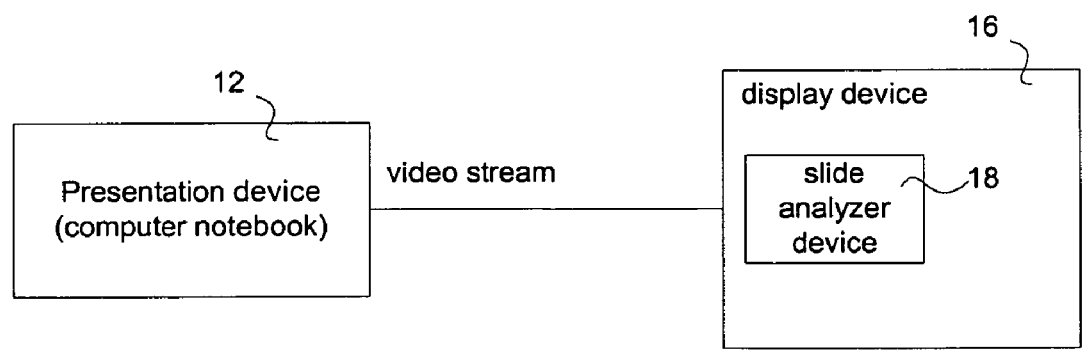
FIG. 2 illustrates a slide analyzer device which is a part of a display device.

FIG. 2 illustrates an alternate embodiment, in which the presentation device 12 provides a video stream to a display device 16. The display device 16 includes a slide analyzer device 18. The slide analyzer device 18 can share a processor and memory with the remainder of the display device 16.

In one embodiment, the slide analyzer device sits between the computer system and the display device 14. In this embodiment, the media system processes the video signal, generates slide images and displays the generated slide images on the display device 14.

Figure 3:
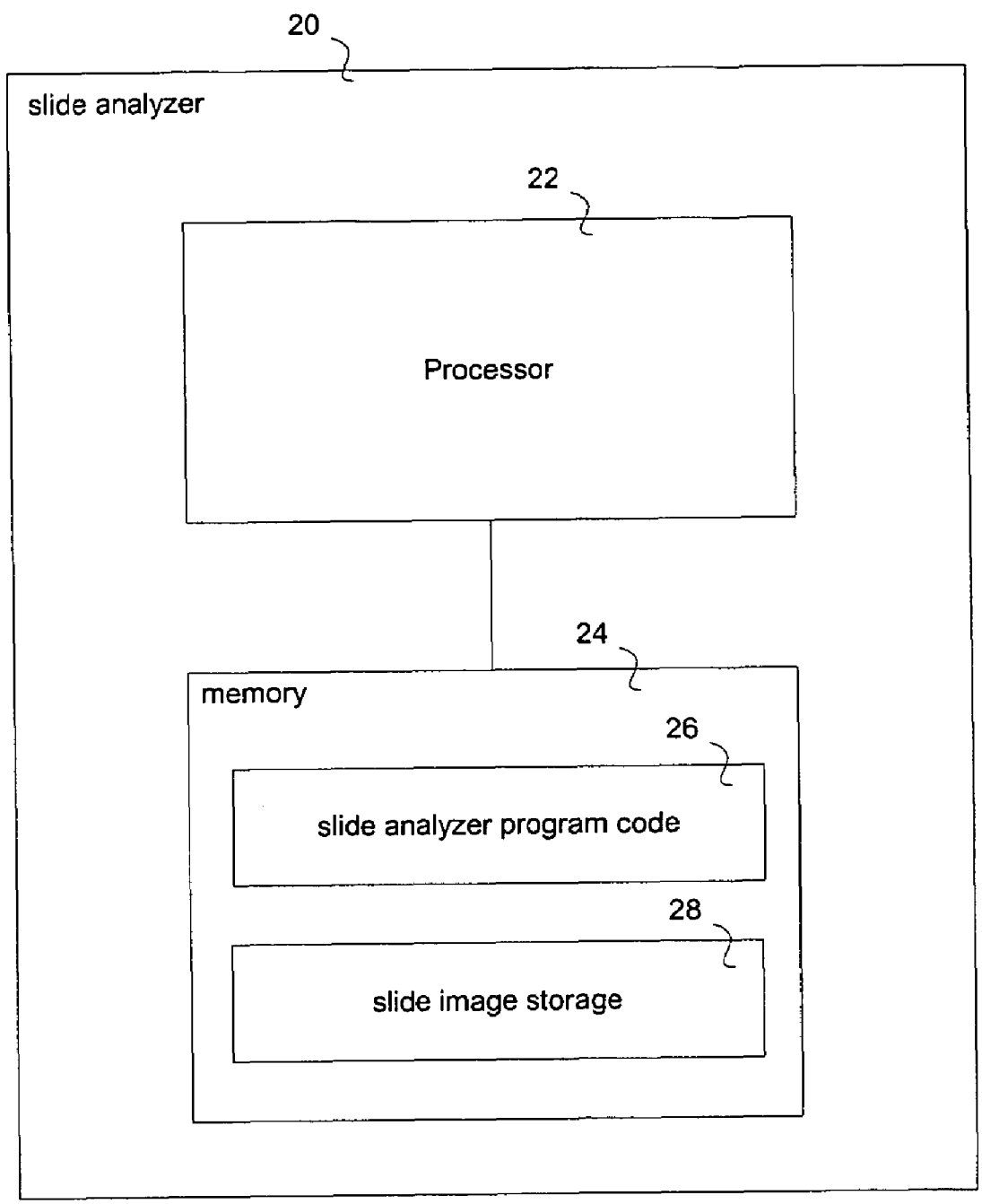
FIG. 3 is a diagram of one embodiment of a slide analyzer device including a processor and memory.

FIG. 3 illustrates a functional diagram of a slide analyzer device 20 with a processor 22 and memory 24. For the purposes of this application, the terms "memory" and "processor" refer to one or more memories and processors. Slide analyzer program code 26 can be stored in the memory 24. Slide images can be archived in the slide storage 28 of the memory 24. The memory 24 can be one or more chip-based, flash, or hard disk drive memories alone or in combination. The processor 22 can be a microprocessor, a dedicated circuit or any another type of processor.

Figure 4:
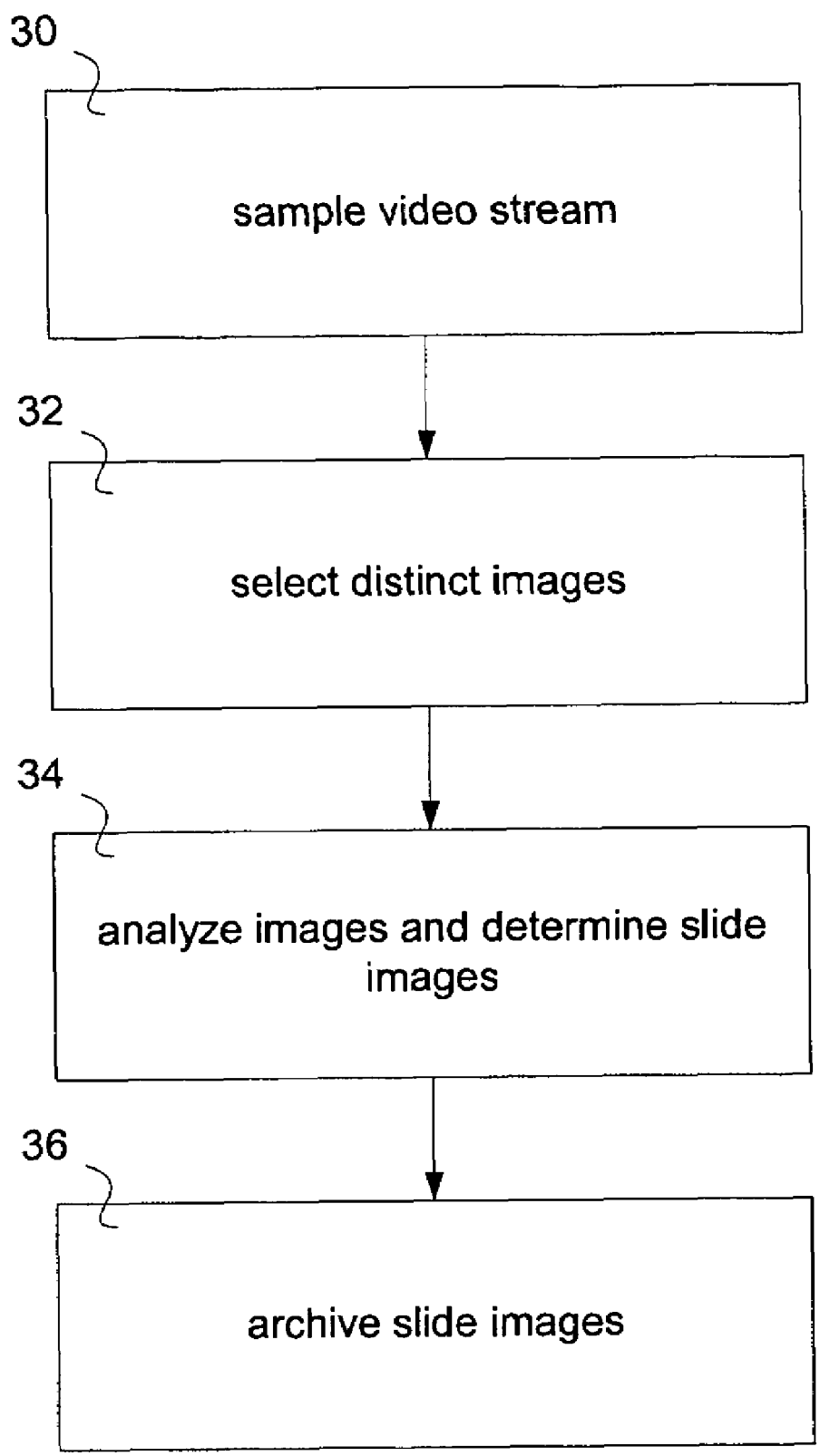
FIG. 4 is a flow chart illustrating one embodiment of a method to determine slide images.

FIG. 4 shows an exemplary flow chart of one method of the present invention. In step 30, the video stream is sampled. In step 32, distinct images are selected from the sampled video stream. In step 34, the images are analyzed and the slide images are determined. As given in examples below, the analyzing can be based on text height and/or edge region(s) of the image. In step 36, the slide images are archived. Slide images of each presentation can be archived together.

Figure 5:
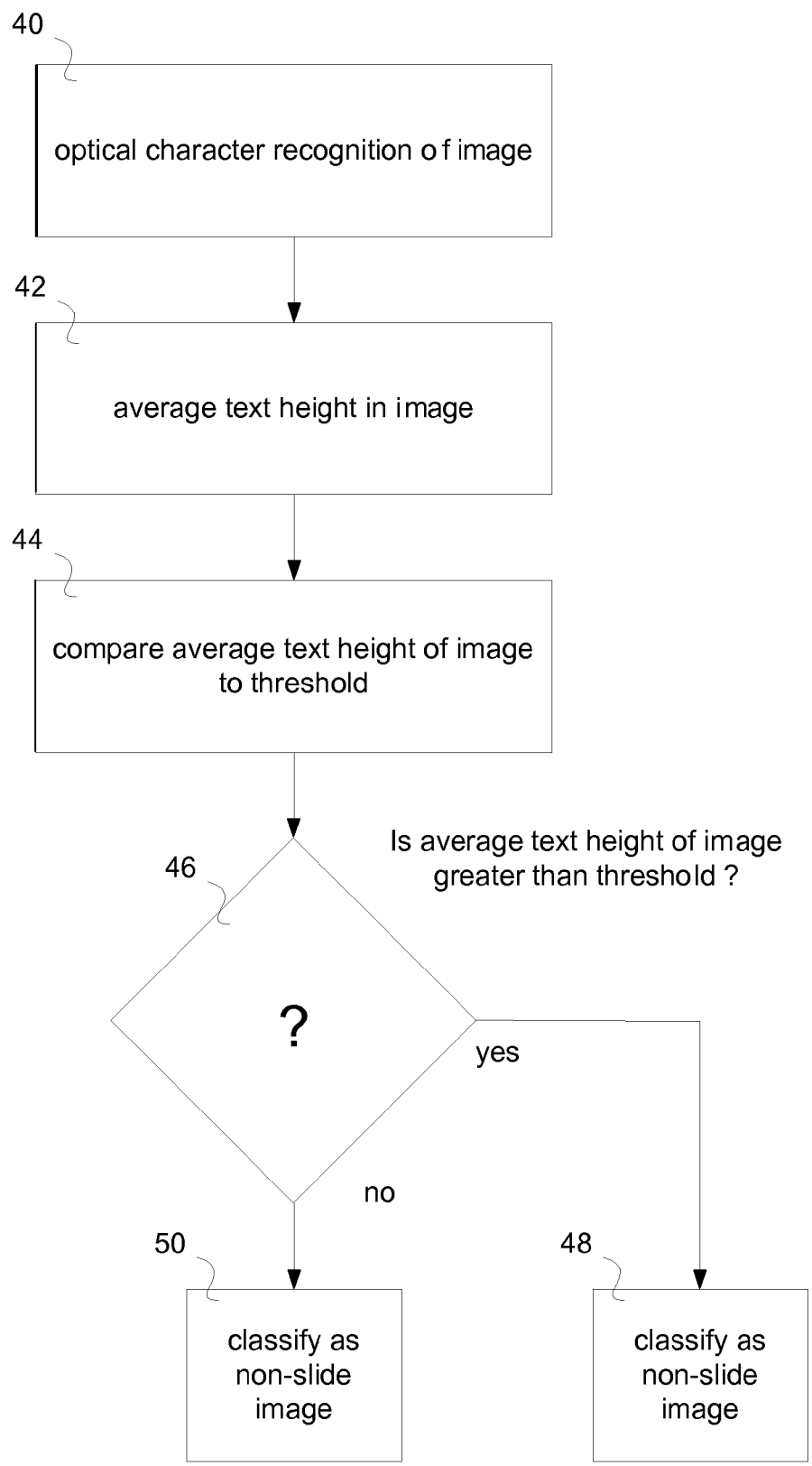
FIG. 5 is a diagram illustrating an embodiment that uses an average text height in an image to classify an image as a slide or non-slide image.

FIG. 5 illustrates a flow chart of one embodiment of the present invention. In step 40, optical character recognition is done on an image. This optical character recognition may be useful for other reasons, such as to obtain a searchable record of the image, so this step might not add undue computational complexity to the process. In step 42, the average text height in the image is determined. The optical character recognition can return bounding boxes identifying the text. The height of the bounding boxes can be used as indication of the text height. The average value of the bounding boxes for the different text elements of an image can be used to determine to produce the average text height. In step 44, the average text height for the image is compared to a threshold. In step 46, it is determined whether the average text height for an image is greater than the threshold. If so, the image is classified as a slide in step 48. If not, the image is classified as a non-slide image, in step 50.

In one embodiment, the threshold is determined using a training set of images. For example, given the training data indexed from $1, \ldots, N_{train}$, denote the average bounding box height of slide i as $h_i$. The threshold of one embodiment is the global mean:

For one set of training data, $\tau=19.517268$, where the total height of the image is calibrated as 1000. The classification procedure simply compares the mean height of the bounding boxes extracted from a test image and compares it to the threshold, $\tau$:

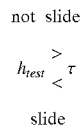

If the mean text height of a test image, $h_{test}$, is greater that $\tau$, the image is labeled as a slide. Otherwise, the image is labeled as a non-slide image.

Figure 6:
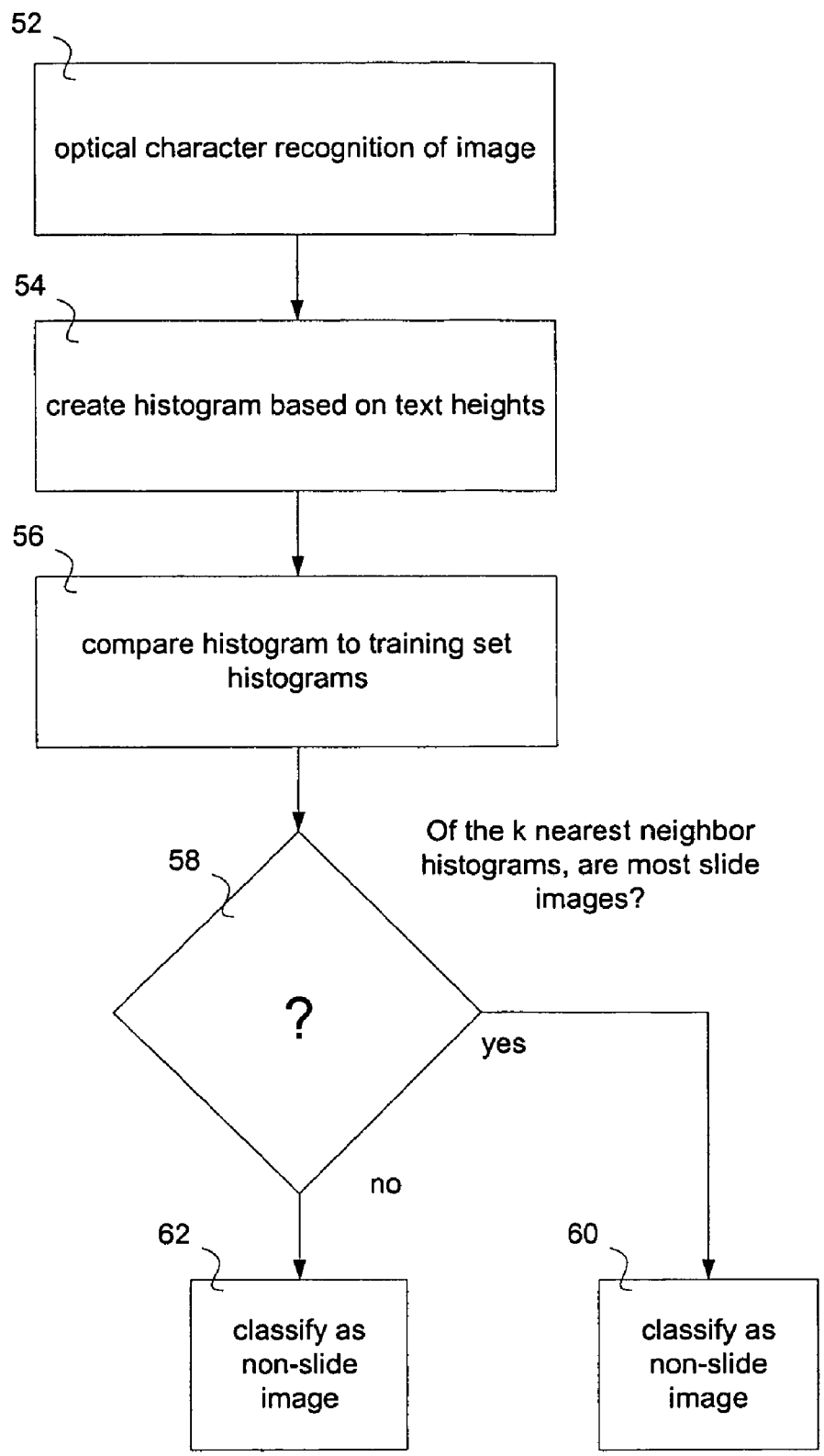
FIG. 6 is a diagram that illustrates the use of text height histograms to classify an image as a slide or non-slide image.

FIG. 6 illustrates an alternate embodiment using the text height. In step 52, optical character recognition of the image is done. In step 54, a histogram based upon the text height is produced. For example, the histogram can indicate the bounding box sizes of the text on the image. In step 56, the histogram is compared to training a set of histograms. In step 58, a k nearest-neighbor classification is done. Of the k nearest neighbor histograms, are most of them slide images? If so, then the image is classified as a slide image in step 60. If not, in step 62, the image is classified as a non-slide image.

In one embodiment, for a k-nearest-neighbor (kNN) classifier, given a set of labeled training data, and a test image, the first step is to determine the k elements of the training set that are closest to the test image in the feature space. Then, among those k training images the majority class label is determined, and that label assigned to the test image. Histograms of the bounding box heights can be used as features.

Any of several distance measures can be selected for determining the nearest neighbors. Denoting the histogram of the $i^{th}$ slide by the vector $X_i$. The distance measures could include the chi-square measure:

$$d_{chi}(X_i, X_j) = \frac{1}{2} \sum_b \frac{(X_i(b) - X_j(b))^2}{(X_i(b) + X_j(b))},$$

the L-1 distance:

$$d_{L1}(X_i, X_j) = \sum_b |X_i(b) - X_j(b)|,$$

and the L-2 distance:

$$dl1(X_i, X_j) = \left( \sum_b (X_i(b) - X_j(b))^2 \right)^{\frac{1}{2}}.$$

The kNN approach provides flexibility in comparison to thresholding. The trade-off between precision and recall can be adjusted according to the application context. The sensitivity of the kNN classification can be controlled using an integer parameter k: $1 \leq k \leq k$. For a given test vector, if at least k/2 out of the k nearest neighbors in the training data are from the "slide" class, we can label the image as a "slide" and otherwise label it as a "non-slide". k can be varied to produce full recall-precision curves.

One embodiment of the present invention uses an analysis of at least one edge of the images. In one embodiment, it's considered likely that if the image is a desktop-based image, the intensities at the edge regions of the image will remain relatively similar. Slides images will tend to have edge regions that may vary more significantly.

Figure 7:
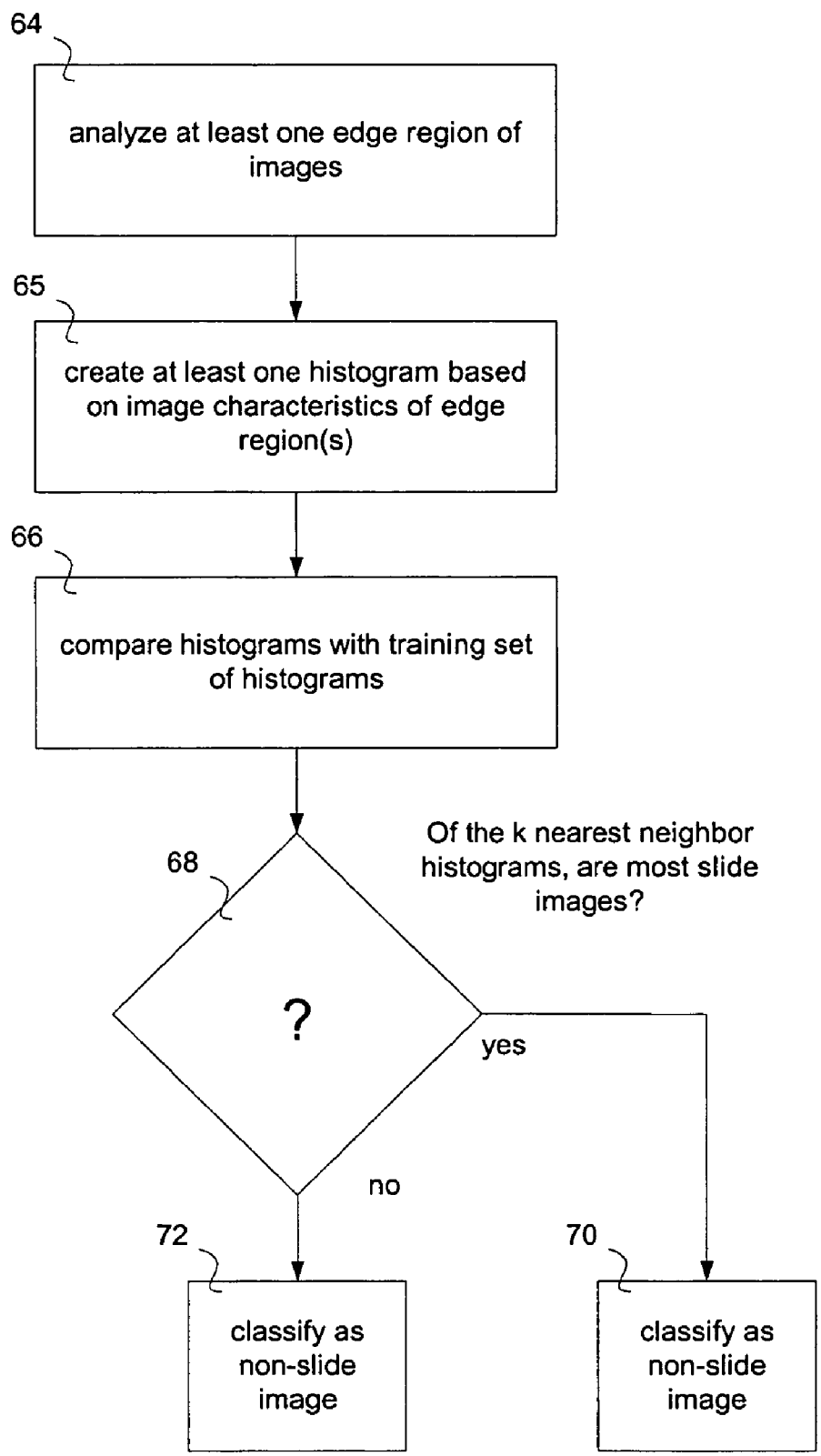
FIG. 7 is a diagram that illustrates the use of a histogram based upon image characteristic of an edge region or regions of the image in order to determine whether the image is a slide or non-slide image.

FIG. 7 illustrates one example of an edge analysis method. In step 64, at least one of the edges of the images is analyzed. In step 65, at least one histogram based upon the image characterization of the edges is done. In step 66, the histogram is compared with a training set of histograms. In step 68, it is checked whether most of the k nearest neighbor histograms are slide images. If so, in step 70 the image is classified as a slide image. If not, in step 72, the image is classified as a non-slide image.

In one embodiment, histograms of the luminance values are used. The edge region can be defined by a predetermined number of rows or columns. In one embodiment, the 10 rows/columns along the top (north), bottom (south), left (west), and right (east) are used to compute a histogram of the luminance values.

One embodiment of the present invention includes a method that uses a combined text height based and edge-region-based characterization of images as slide or non-slide images. One example of such a combined method is described with respect to FIG. 8.

In step 34, a text height based determination of the slide images is done such that a first set of slide images is characterized with relative confidence. The text height based determination can be an average text height determination with its threshold set relatively high. For example, the theshold can be larger than a normal threshold. The threshold can be set at a percentage, such as 50%, greater than a threshold for a single pass text-height based slide image determination. For example, if a threshold of 20 (out of a possible 1000) is normally used in a single pass algorithm, a threshold of 30 (out of a possible 1000) could be used in a combined method. In this way, a first set of slide images can be relatively confidently assumed to be slide images. In step 76, the first set of slide images are used to characterize the edge regions with respect to the remaining images. In step 78, an edge region based determination can be used to find additional slide images from the remainder images.

This slide analyzer device can be a part of a media system that enables the extraction, classification, storage, and supplementation of presentation video. The media system can receive a signal carrying presentation video. The media system can process the video stream and generate images for slides of the presentation. The media system can then extract text from the images and use the text and other characteristics to classify the images and store them in a database.

The media system can automate the process of detecting, capturing, interpreting, and storing presentations. The system can detect when a presentation is beginning and initiate a process that detects whether content is static or dynamic and stores and classifies it accordingly. The system can also modify the content for ease of organization and distribution, distribute the content to viewers in an original or modified format, and end operations when a presentation is no longer detected. The steps above can be performed without any direct user commands to start and stop operations or any user sorting/separation/organization of the media.

The media system can receive the video stream, use it to generate audio and video media for the presentation, and extract relevant information from the media. In some embodiments, the media system is a conventional computer using specialized software, in alternate embodiments, the media system is a computer specially configured to function as a media system. In some embodiments, the media system is also configured to collect audio through a microphone or other input. The audio can be stored in association with the presentation images and video.

The media system may also accept image overlays and supplements, or other modifications, and output them to a display device. Alternately, the overlays can be generated by an automatic agent such as a translator program that automatically translates the text of the presentation. The media system can also include a "pass-through" mode where the input video signal is passed directly, without modification, to the output device.

The media system can include a video capture module, an image sampling module, an image converter, an update module, a text extraction module, a database, and an input/output module. These components may be implemented through any combination of hardware, software, and firmware.

The video capture module can receive the video signal from the splitter or computer system. The image sampling module can generate slide images from the video captured by the video capture module. In one embodiment, the image sampling module detects if a particular image has been broadcast steadily for a predetermined amount of time and treats it as a single slide. Alternately, continuous video is recorded in full. If the sampling module determines that the image is a slide it generates a bitmap for the image. If it determines that the media is video, a video recording of either the whole capture or a segment of the window that contains video, is captured.

The image converter may optionally convert the bitmap to a more size efficient format such as JPEG or another format. An update module can be configured to generate categorization information for media and to store the media, with the categorization information, in the database. In some embodiments, the update module first utilizes the text extraction module, which detects text in the image and provides the text to the update module.

The categorization information can include date/time information for the presentation, an identifier for the particular presentation being shown, characteristics of the image, supplemental information received from either the presenter or the viewers, and text within the image. Some categorization information is generated after the presentation has been recorded while some categorization information is generated in real time.

The input/output module can be used to generate an interface for configuring the media system. The interface can be a console interface on the media system itself, graphical user interface that is accessed through input/output devices such as a keyboard and monitor that are connected to the media system, or a web interface that is accessed over a network. The input/output module can also be used to transmit overlays and video supplements to the media system, which uses the overlays to modify the image. In one embodiment, the input/output module comprises a web server running on the media system. By viewing an interface page on the web server, viewers of the presentation can submit questions and comments as overlays for the presentation. The web server can also be used as an interface for submitting search queries for images stored in the database.

Categorization information can be used for stored media. The categorization information can include metadata and classification information. The metadata can be stored in association with the media and generated when the media is first captured. The classification information can be stored in association with the media or centrally. The classification information can be generated after a presentation rather than in real-time. The metadata can include content information. The content information can indicate whether the stored video comprises a single slide image, a video clip containing continuous video, audio, or some other type of media.

The metadata can additionally include text information. The text information can include text that has been extracted from the slide image by a text extraction module. The information can include all of the text or particular key words that were designated as representative words for searches. The text information can include weights or other information indicating the importance of particular text in the slides. For example, the text extraction module can be programmed to recognize title text or section headings and give that text greater importance in classifying the slide image.

The metadata can additionally include video characteristics. The video characteristics can include image characteristics that are extracted from the slide image. These can include colors or distinctive shapes or other image qualities. The metadata can additionally include supplemented information. The supplemented information includes overlays and other information that is provided by a presenter, automatic agent, or the audience during a presentation.

The classification information can include an identifier for the presentation from which the image is extracted. It may also include time and date information for the presentation. For example, all of the video or slides for a single presentation can include the same identifier within the classification information. Presentation data can also be grouped by meeting or day with all of the presentation data for a single meeting or day classified associatively. Artificial categorizations that associate presentations that are related in other ways can also be added.

The categorization information can be used by an associated search utility to retrieve presentation content in response to submitted search requests. Users of the search utility can search according to content or organizational data (i.e. when a presentation was shown, content shown at a meeting or presentation) and the search utility will return media, complete presentations, or sections of presentations matching the search request.

The media system can accept presentation video and/or audio, preferably through a video capture module. In some embodiments, the system can detect when a presentation has begun by analyzing an incoming video stream and detecting characteristics indicative of a presentation. This process can also be used to stop recording when the detected video characteristics indicate that a presentation is no longer being transmitted. The media system can extract the presentation information. This step can include the determination of what type of media is being presented, the extraction of slide images or video streams from the video, the conversion of the slide images to JPEGs, and the extraction of text from the image. This step may also include the extraction of video streams and audio streams. This step can also include analysis of audio content, for changes in volume, detection of words through speech to text extraction, and any other useful or relevant characteristics of the audio. Audio content can be classified according to characteristics of the audio, characteristics of video detected at the same time, or both.

The system can use a variety of methods for categorizing the input received from the video signal and categorizing it accordingly. In one embodiment, the system can analyze a predetermined number of consecutive frames and categorize it appropriately. In one embodiment, the system detects a slide or other stable presentation by detecting unchanging video frames for more than a predetermined amount of time.

Video can be detected in a similar manner. In one embodiment, the system computes the difference between a series of consecutive frames. The system checks for a region in the series of frames in which the frames are always changing (the difference between successive frames is not null). If it finds a region that changes continually, it determines that a video clip is playing. In some embodiments, the system can crop the sections of the frames that are not changing. In alternate embodiments, the entire frame is cropped.

The media, which can include video, slides, or audio, can be stored in association with the presentation information. The presentation information can be supplemented with overlays. These overlays can be received from the presenter, an automatic agent, or the audience through the web server generated by the input/output module. In one embodiment, the presenter can accept questions from audience members through a network interface. The questions can be overlayed on the slide image. The supplemented image can be output to the display device.

An image sampling module can determine a type for the content. For example, video clips can be identified if a section of the image changes continuously and stored as continuous segments. In one embodiment, the image sampling module check for images that are displayed continuously for a predetermined amount of time, designate those images as static images, and generates bitmaps for the images. The system can apply other criteria as well. In one embodiment, the font size of any text in the image is used, with larger text indicating a greater likelihood that the image is a slide. The image sampling module can also extract audio from the media stream, to be stored in association with video or images captured concurrently.

The image converter can convert the content to more compact format, such as GIF or JPEG for images, or MPEG for video. This step is optional, and in some embodiments, the image is stored in an uncompressed form. The update module can generate a new entry in the database. The entry can be created with initial categorization information such as the content type for the media and video characteristics.

The update module can utilize the text extraction module to extract text from the image or video. The text can include weights or other information indicating the importance of particular text in the slides. For example, the text extraction module can be programmed to recognize title text or section headings and give that text greater importance in classifying the content. The content can be stored in the database. This step can also entail adding the extracted text and any other supplemental information.

In some embodiments, the media system transmits special presentation display information over a network connection, which is received by the viewers at their terminals or computers, and is processed and displayed by an application on the recipients' computers. The media system, through the input/output module can accept annotations from either the viewers or the presenter. The annotations can be comments or supplemental overlays (drawings added to the slides through a mouse or writing tool). Alternately, the annotations can be questions or comments transmitted from the viewers. In some embodiments, the questions or comments are displayed in a preset section of the image.

The annotated presentation can be displayed in real time. In alternate embodiments, the annotations are collected during the presentation and displayed when the presenter returns to an earlier stage of the presentation.

The slide image can be stored in a database or other memory with the annotations stored in the supplemented information.

An application module on a computer system, either as part of the presentation generation program, or independently, is configured to detect the creation of a new presentation. The application module can be configured to access the database on the media server. The application module can, according to the text input in the presentation, determine search terms for the presentation. Using the search terms, the application can search the database for related content, cross-referencing the search terms with the identification information. The system can provide images matching the search term and prompts a user to include them. Responsive to user acceptance, the search terms can be included in the presentation.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed is:

1. A device comprising:
    a processor to analyze images of a video stream, wherein a height of text located in at least one predetermined edge region of the video stream is analyzed in the images to classify the images of the video stream as being slide images or non-slide images, wherein the edge region comprises the outermost north, east, west or south borders of the video stream; and
    a memory to store the slide images.

2. The device of claim 1, wherein the processor performs optical character recognition on the images to return bounded boxes identifying the text in the images.

3. The device of claim 1, wherein the processor compares an average height of text in an image of the images to a threshold.

4. The device of claim 3, wherein the processor determines images whose average text size is greater than the threshold to be slide images.

5. The device of claim 1, wherein the processor samples the video stream to obtain the images.

6. The device of claim 1, wherein the processor creates histograms indicating the bounding box sizes of the text of the images and does a nearest neighbor classification on the histograms to determine whether the images are slide images.

7. The device of claim 1, wherein the at least one predetermined edge region of the video stream includes a predetermined number of rows or columns.

8. The device of claim 1, wherein a plurality of predetermined edge regions are analyzed.

9. The device of claim 1, wherein luminance values of the at least one predetermined edge region of the video stream are examined.

10. The device of claim 1, wherein the processor samples the video stream to obtain the images.

11. The device of claim 1, wherein the processor uses text height in any region of the video stream to determine a first set of slide images, and uses characteristics of at least one predetermined edge region around the outer border of the first set of slide images to evaluate remaining images to classify additional slide images.

12. A computer-readable medium having a program of instructions stored thereon that performs a function, the function comprising the steps of: capturing an input video stream; and
    analyzing a height of text located in at least one predetermined edge region of the video stream to classify the images of the video stream as being slide images or non-slide images, wherein the edge region comprises the outermost north, east, west or south borders of the video stream.

13. The program of claim 12, wherein the average height of text in the image is compared to a threshold.

14. A method for classifying images of a video stream as being slide images and non-slide images, the method comprising:
    capturing an input video stream; and analyzing a height of text located in at least one predetermined edge region of the video stream to classify the images of the video stream as being slide images or non-slide images, wherein the edge region comprises the outermost north, east, west or south borders of the video stream.

15. The method of claim 14, further comprising:
    performing optical character recognition on the images to return bounded boxes identifying the text in the images.

16. The method of claim 14, further comprising:
    comparing an average height of text in an image of the images to a threshold.

17. The method of claim 16, further comprising:
    determining images whose average text size is greater than the threshold to be slide images.

18. The method of claim 14, further comprising:
    sampling the video stream to obtain the images.

19. The method of claim 14, further comprising:
    creating histograms indicating the bounding box sizes of the text of the images; and
    performing a nearest neighbor classification on the histograms to determine whether the images are slide images.

20. The method of claim 14, wherein the at least one predetermined edge region of the video steam includes a predetermined number of rows or columns.

21. The method of claim 14, wherein a plurality of predetermined edge regions are analyzed.

22. The method of claim 14, further comprising:
    examining the luminance values of the at least one predetermined edge region of the video stream.

* * * * *